(12) United States Patent
Lu

(10) Patent No.: US 7,412,752 B2
(45) Date of Patent: Aug. 19, 2008

(54) POSITIONING STRUCTURE FOR PIVOTAL SHAFT

(76) Inventor: Sheng-Fu Lu, No. 6, Lane 276, Shih Yuan Road, Jui Yuan Li, Tashi Town, Taoyuan Hsien (TW)

( * ) Notice: Subject to any disclaimer, the term of this patent is extended or adjusted under 35 U.S.C. 154(b) by 546 days.

(21) Appl. No.: 11/184,970

(22) Filed: Jul. 20, 2005

(65) Prior Publication Data
US 2006/0288534 A1 Dec. 28, 2006

(51) Int. Cl.
*E05D 11/10* (2006.01)
(52) U.S. Cl. .................................. 16/334; 16/354
(58) Field of Classification Search ............. 16/334, 16/324, 333, 297, 344, 354, 321, 326, 332; 361/680, 681, 682, 683; 455/575.3; 379/433.13
See application file for complete search history.

(56) References Cited

U.S. PATENT DOCUMENTS

| | | | | |
|---|---|---|---|---|
| 3,484,831 A | * | 12/1969 | Teiji | 403/103 |
| 5,109,572 A | * | 5/1992 | Park | 16/334 |
| 5,185,790 A | * | 2/1993 | Mischneko | 379/433.13 |
| 6,762,928 B2 | * | 7/2004 | Lo | 361/681 |
| 2004/0032708 A1 | * | 2/2004 | Lo | 361/681 |
| 2007/0010299 A1 | * | 1/2007 | Lai et al. | 455/575.3 |

FOREIGN PATENT DOCUMENTS

| | | | | |
|---|---|---|---|---|
| JP | | 02172379 A | * | 7/1990 |
| JP | | 02238484 A | * | 9/1990 |

* cited by examiner

*Primary Examiner*—Robert J Sandy
*Assistant Examiner*—Jeffrey O'Brien
(74) *Attorney, Agent, or Firm*—Troxell Law Office, PLLC

(57) ABSTRACT

A positioning structure for a pivotal shaft comprises a positioning device for use in the pivotal shaft. The positioning structure is located between a base and a lid of an electronic product, wherein an inner sleeve is pivotally connected to an outer sleeve through an elastic device. The positioning device is composed of a rotation ring and a ring cover. A toothed ring is mounted on each side of the rotation ring, and a limit block is protrudent from the edge of the rotation ring. The ring cover has a locking trench, and the toothed rings are inserted into the locking trench. The elastic device is pre-rotated. When the push-button switch is separated from the buttonhole by pressing, the lid is lifted up by the anti-twist force and the lower edge of the lid is exactly stopped by the limit block for positioning the lid to a predetermined angle automatically.

1 Claim, 11 Drawing Sheets

POSITIONING STRUCTURE FOR PIVOTAL SHAFT

FIELD OF THE INVENTION

The present invention is related to a positioning structure for a pivotal shaft, and more particularly to a positioning structure with the function of automatic rotation, and this positioning structure can be adjusted manually such that the lid can be lifted up to a predetermined position to achieve the purposes of lifting up and positioning the lid automatically.

BACKGROUND OF THE INVENTION

For the purpose of being carried easily, the electronic products are gradually provided with foldable structure for reducing their sizes. Among these foldable electronic products, the electronic product with automatic liftable lid is always provided with no function about multi-directional positioning. For example, the lid of the common mobile phone can be rebounded to a fixed position once the lid is opened. Besides, the lid of the electronic product such as the mobile audio-visual player, the hand-held video game, etc., can be lifted up manually. Thereafter two gears or other locking devices are applied to engage with one another so as to achieve the function of pivotal rotation and multi-directional positioning.

Generally speaking, when the product property and the usage convenience are taken into consideration, the general electronic product is usually equipped with either the automatic liftable lid or the multi-directional positioning structure since these two structures are constructed of different devices. For example, if the hand-held audio-visual product is equipped with the automatic liftable lid, its convenience in usage is promoted, but the view angle between the user and the LCD panel must be kept in a predetermined range so as to view the LCD panel clearly. Therefore, there is still a need to enable the user to multi-directionally adjust the view angle of the electronic product. Consequently, one topic of the present invention is to integrate these two functions with one another.

SUMMARY OF THE INVENTION

In view of the foregoing drawbacks of the conventional structure, the present inventor provides the industry with a positioning structure for use in a pivotal shaft in accordance with the inventor's accumulated knowledge.

It is a main object of the present invention to provide a positioning structure for a pivotal shaft. If the push-button switch is separated from the buttonhole by pressing, the lid is lifted up by the anti-twist force and the lower edge of the lid is exactly stopped by the limit block of the rotation ring for positioning the lid to a predetermined angle automatically. As a result, the function of automatic, pivotal rotation is provided for the lid.

Other objects and features of the present invention will become apparent from the following detailed description when taken in conjunction with the drawings in which:

DETAILED DESCRIPTION OF THE PREFERRED EMBODIMENT

The above-mentioned features and advantages of this invention, and the manner of attaining them, will become more apparent and the invention will be better understood by reference to the following description of embodiments of the invention taken in conjunction with the drawings.

Figure 1:
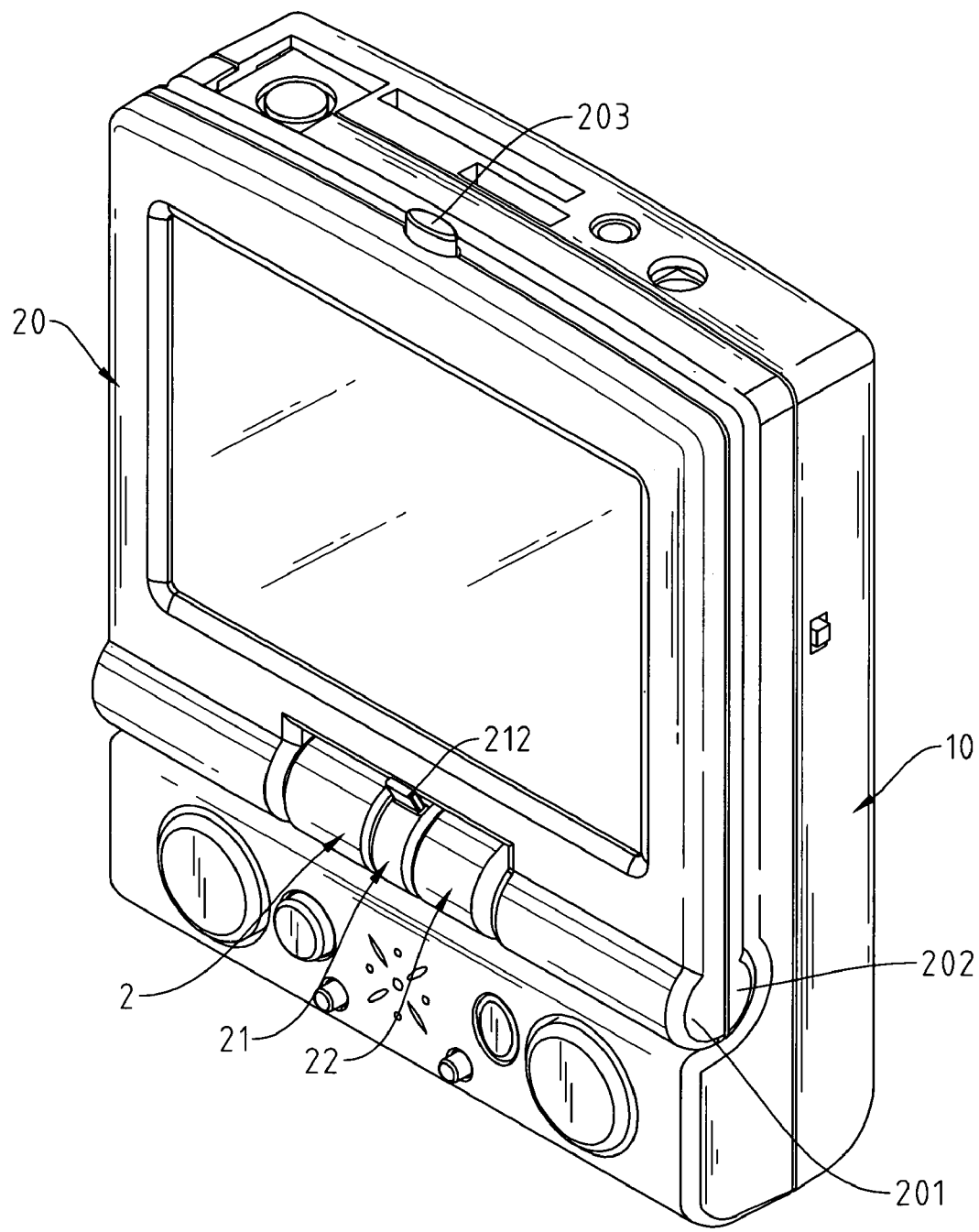
FIG. 1 is an elevational view showing that the present invention is applicable to the electronic product.
Figure 2:
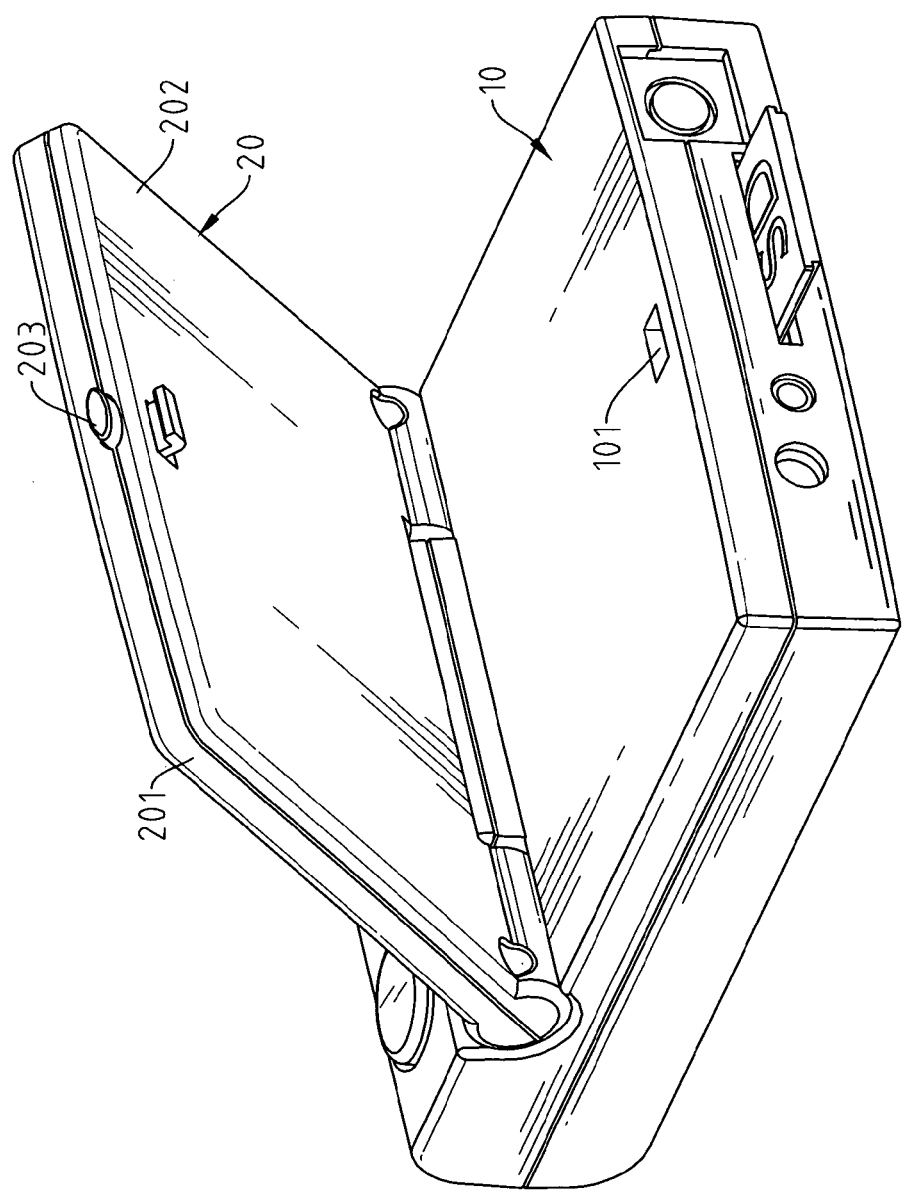
FIG. 2 is an elevational view showing that the lid of the present invention is pivotally lifted up.

Referring to FIG. 1 and FIG. 2, a positioning structure for a pivotal shaft in accordance with the present invention is located between a base 10 and the bottom of a lid 20 of an electronic product (shown in FIG. 1). By pressing a push-button switch 203 to separate it from a buttonhole 101 of the base 10, the lid 20 can be lifted up to a limit position through the anti-twist force generated by the pre-twisted spring, as shown in FIG. 2. As a result, the positioning structure for the pivotal shaft in accordance with the present invention is able to achieve the function of automatic positioning.

Figure 3:
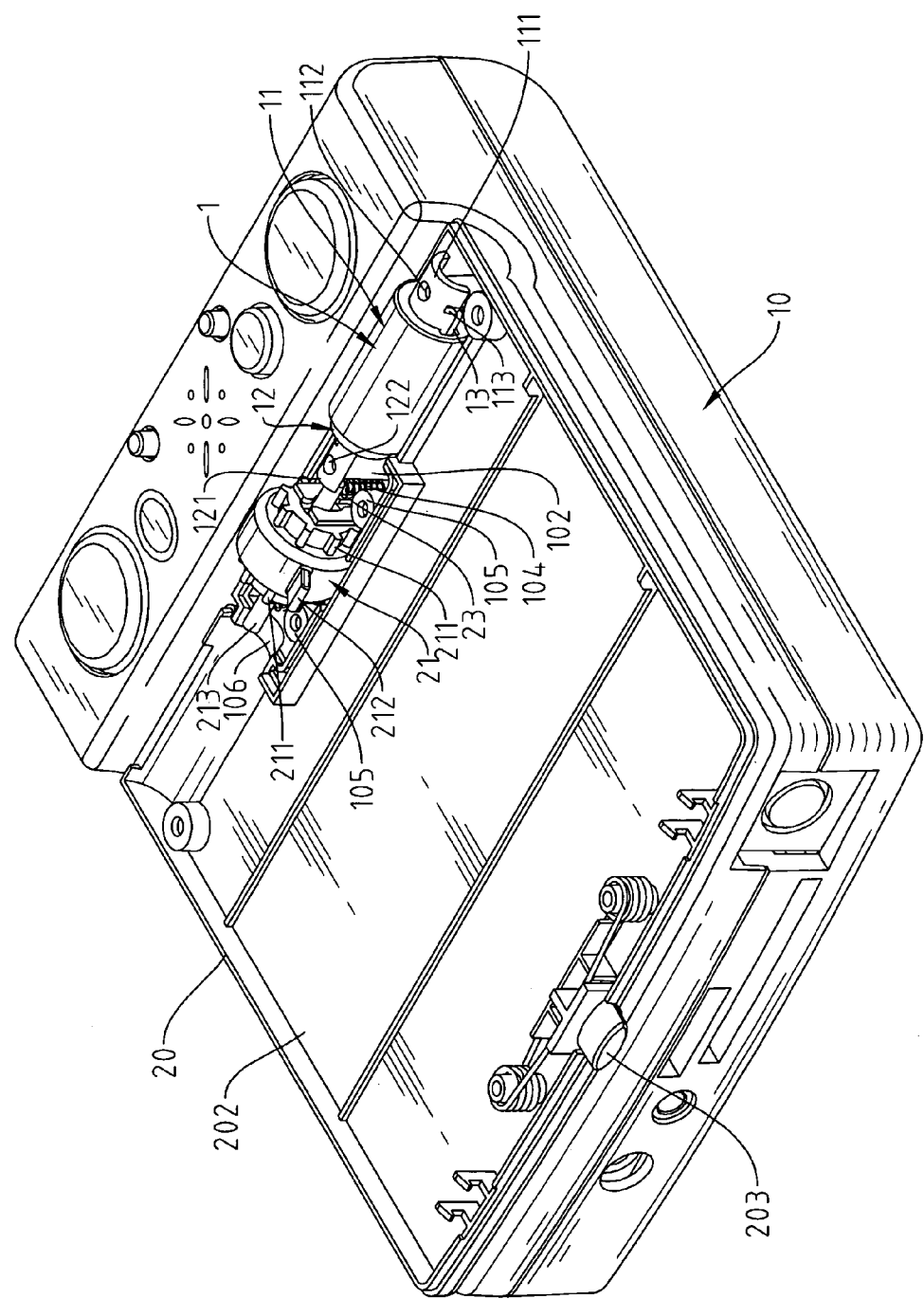
FIG. 3 is a diagram showing the mounting position of the positioning structure for the pivotal shaft in accordance with the present invention.
Figure 4:
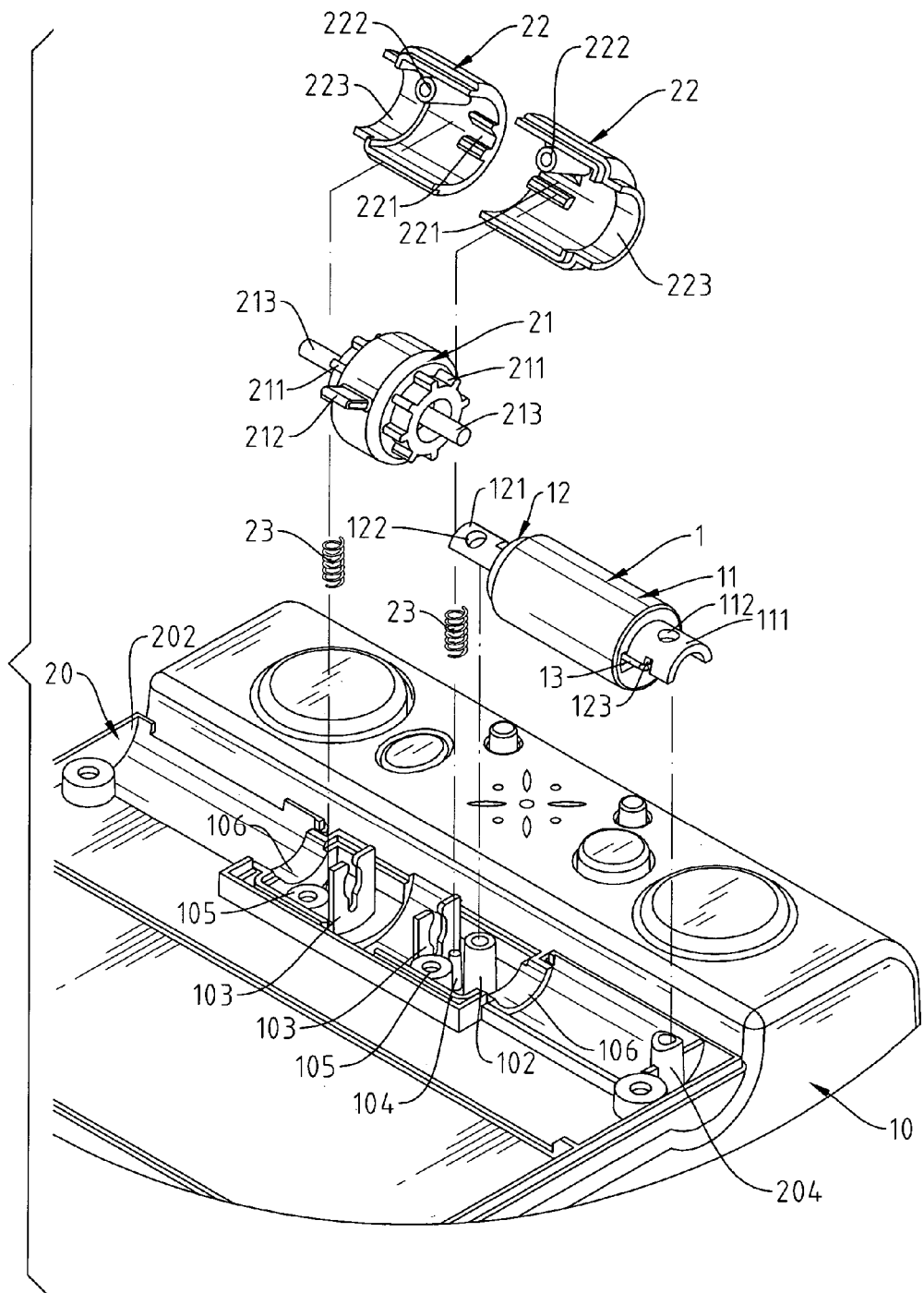
FIG. 4 is a decomposed view showing the positioning structure for the pivotal shaft in accordance with present invention.

Referring to FIG. 3 through FIG. 10, the lid 20 is composed of an upper cover 201 and a lower cover 202. The lid 20 has a gap on the bottom center and a shaft hole 205 (shown in FIG. 6) on each of two opposite ends. An arc-shaped trench is formed on each of two ends of the bottom of the lower cover 202, wherein two positioning pillars 102, 204 are mounted on the trench on one side and the base 10 in a proper spacing, respectively. The base 10 has a pair of reception trenches 103 in positions corresponding to the central gap of the lid 20. Besides, an arc-shaped flange 106 is mounted on each side of the gap. A vertical rod 104 is mounted on each side of the reception trench 103. As shown in FIG. 4, locking holes 105 are mounted above the vertical rod 104.

Figure 6:
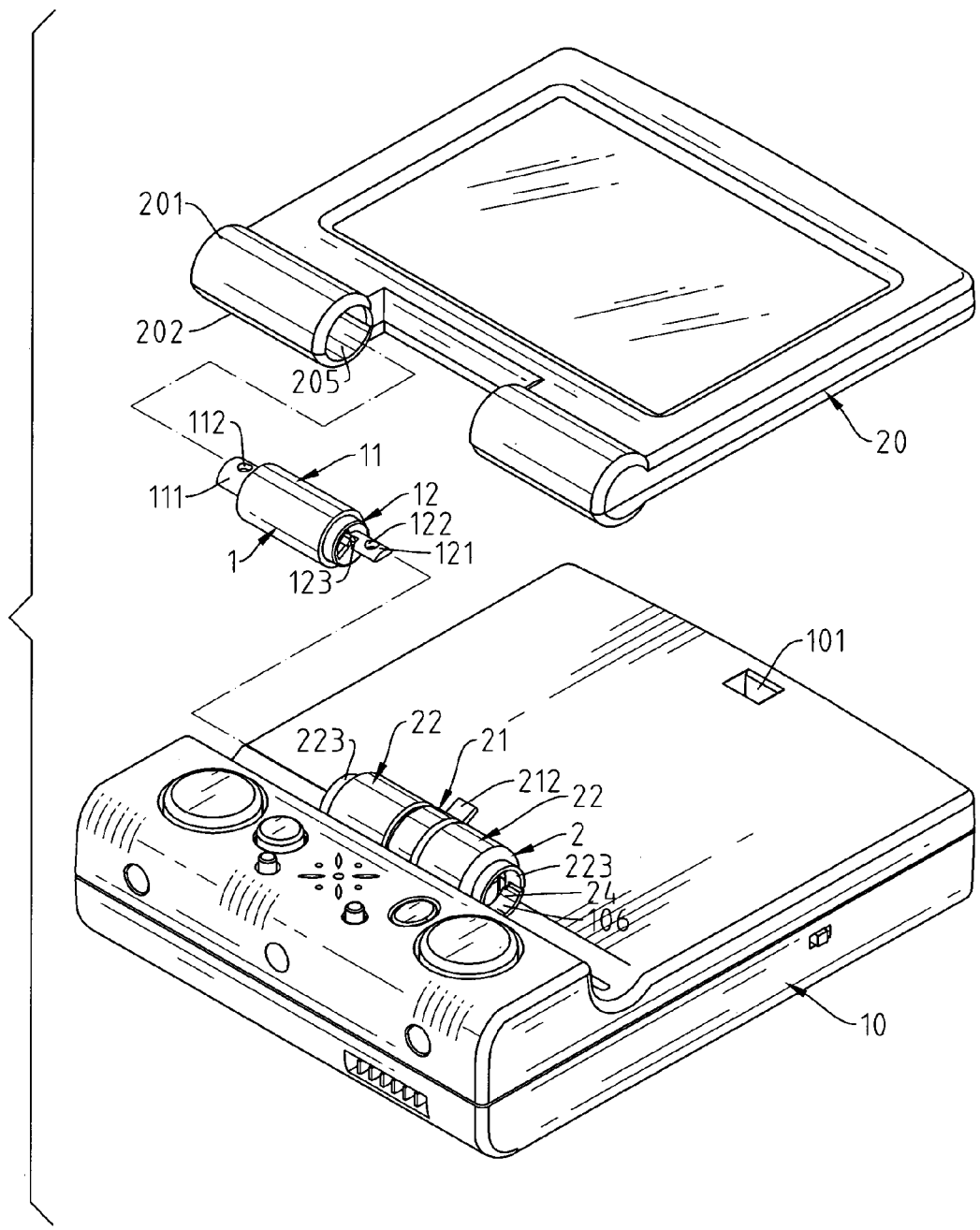
FIG. 6 is a schematic view showing that the lid of the present invention is axially connected to the base.
Figure 8:
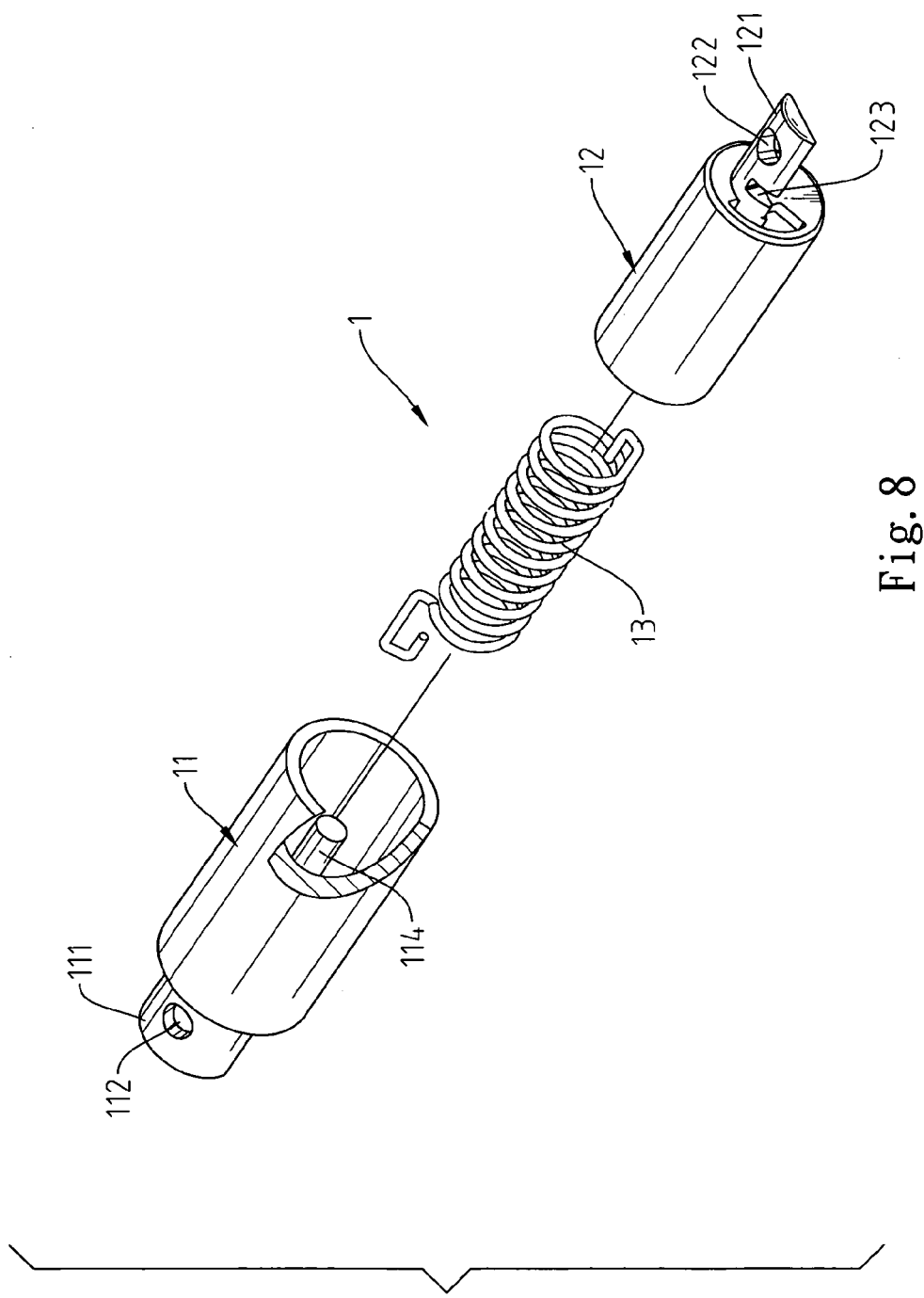
FIG. 8 is a partial decomposed view showing the positioning device of the present invention.
Figure 9:
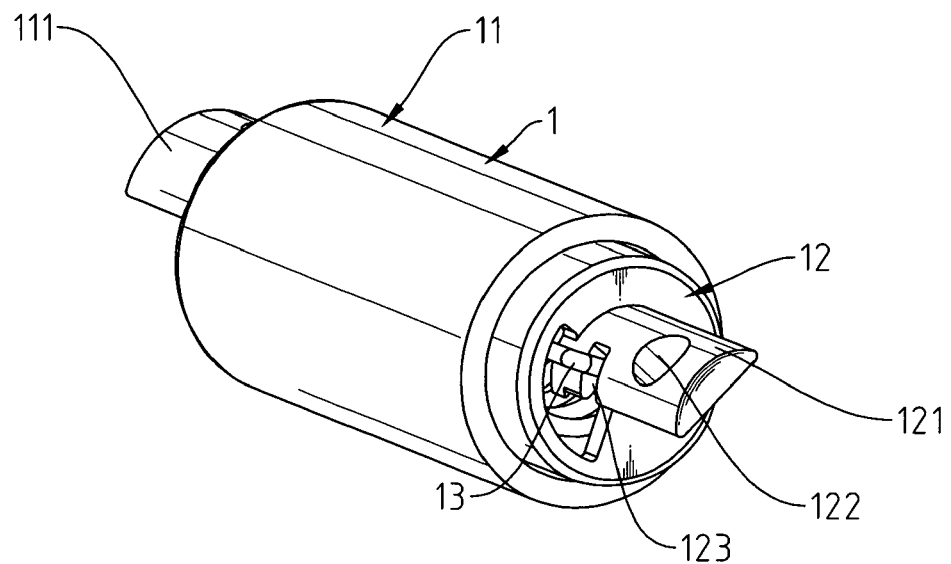
FIG. 9 is a diagram showing that the outer sleeve of the present invention is coupled to the inner sleeve.
Figure 10:
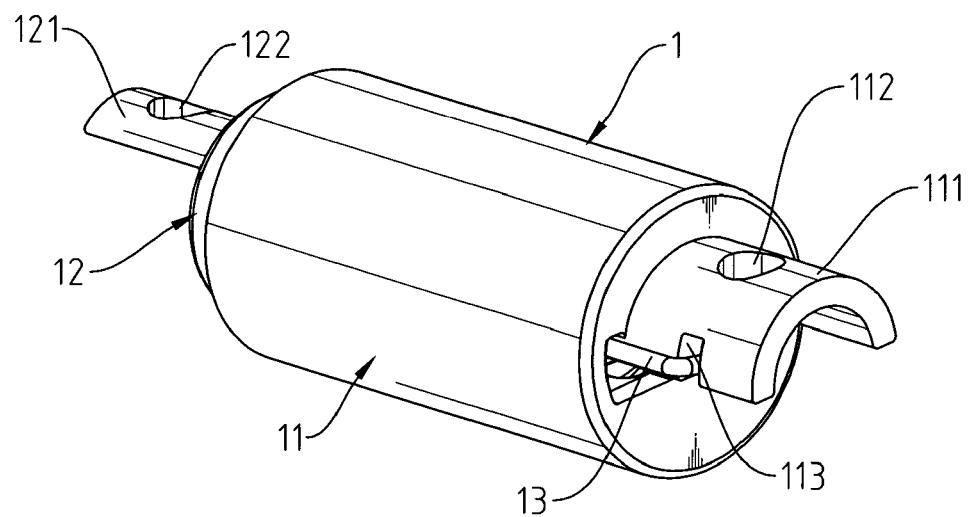
FIG. 10 is a diagram showing the structure of FIG. 9 as viewed from another direction.

The positioning structure for the pivotal shaft comprises a positioning device 2 for use in a pivotal shaft 1. As shown in FIG. 6, the pivotal shaft 1 is pivotally connected to one of the shaft holes 205 of the lid 20, and the shaft holes 205 of the lid 20 are axially connected to two protrudent rods 24 mounted on both ends of the positioning device 2. The pivotal shaft 1 is composed of an outer sleeve 11, an inner sleeve 12, and an elastic device 13. As shown in FIG. 8 through FIG. 10, two arc-shaped fixing rods 111, 121 are transversely extended from respective ends of the sleeves 11, 12, and two through holes 112, 122 and notches 113, 123 are formed on the edge surfaces of the fixing rods 111, 121. An axial rod 114 is mounted along an axial of the outer sleeve 11 for being inserted into the elastic device 13. If the fixing rods 111, 121 are located in different directions, the inner sleeve 12 is pivotally mounted in the outer sleeve 11, and the both ends of the elastic device 13 are located to hook the notches 113, 123 of the fixing rods 111, 121, respectively, so as to enable the fixed elastic device 13 to generate the anti-twist force by pre-rotating the inner sleeve 12. Next, as shown in FIG. 3, the inner sleeve 12 and the outer sleeve 11 are respectively fixed on the positioning pillars 204, 102 through the through holes 112, 122. If the push-button switch 203 is separated from the buttonhole 101 by pressing, the lid 20 is lifted up by the anti-twist force, which is generated by the released elastic device 13 of the pivotal shaft 1, since the lid 20 is locked to the buttonhole 101 through the push-button switch 203. As a result, the function of automatic, pivotal rotation is generated.

Figure 5:
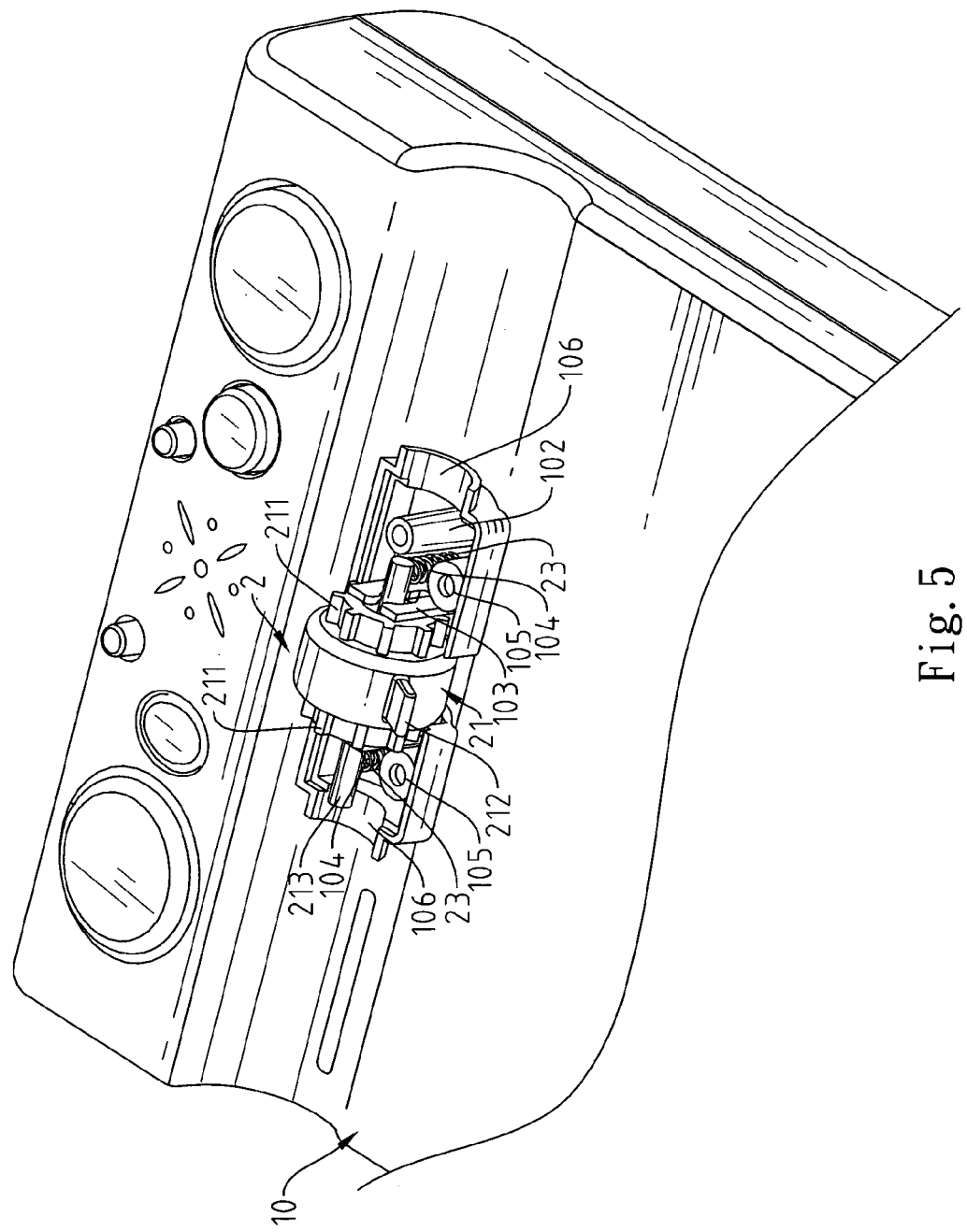
FIG. 5 is a diagram showing the mounting of the positioning device of the present invention.
Figure 7:
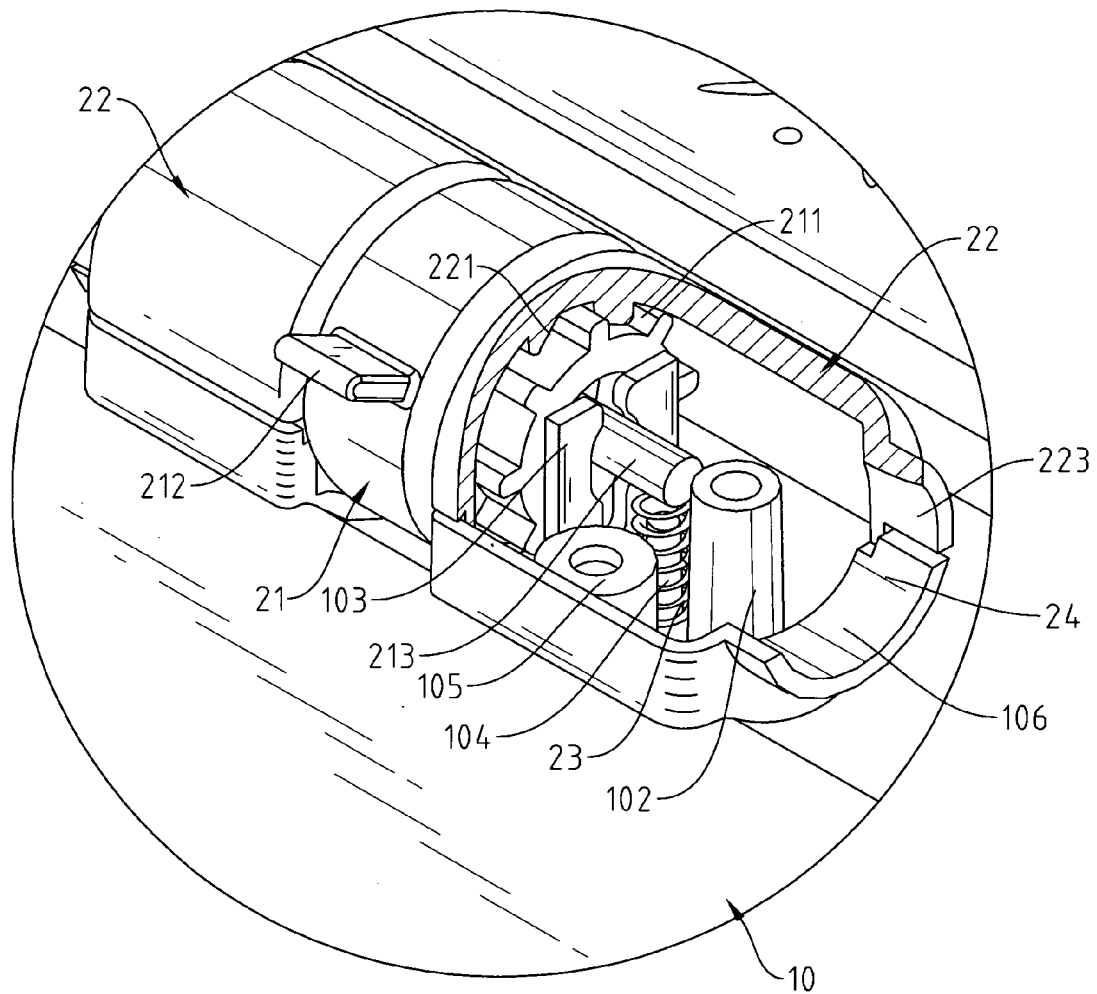
FIG. 7 is a cross-sectional view showing the positioning device of the present invention.

Besides, the vertical rods 104 are inserted into the compression springs 23, and as shown in FIG. 5, the positioning device 2 is pivotally mounted on the center of the base 10. Besides, the protrudent rods 24 of the positioning device 2 are axially connected to the shaft hole 205 of the lid 20. As shown in FIG. 4, the positioning device 2 is composed of a rotation ring 21 and a ring cover 22. A toothed ring 211 is mounted on each side of the rotation ring 21, and a limit block 212 is protrudent from the edge of the rotation ring 21. Besides, an axial shaft 213 is mounted along the axial of the rotation ring 21 and extended out of its rotation ring 21. The axial shaft 213 is pivotally mounted in the reception trenches 103 such that the axial shaft 213 of the positioning device 2 is located to lean on the compression springs 23. In addition, an arc-shaped flange 223 is mounted on each side of the ring cover 22 for being coupled to the arc-shaped flange 106 of the base 10 to form the protrudent rod 24. Besides, a locking trench 221 is defined by two protrudent parts on the inside of ring cover 22, and protrudent pillars 222 are mounted on the inside of the ring cover 22 corresponding to the locking holes 105 so as to securely lock the ring cover 22 on the toothed rings 211 of the rotation ring 21 and insert the toothed rings 211 into the locking trench 221, as shown in FIG. 7.

Figure 11:
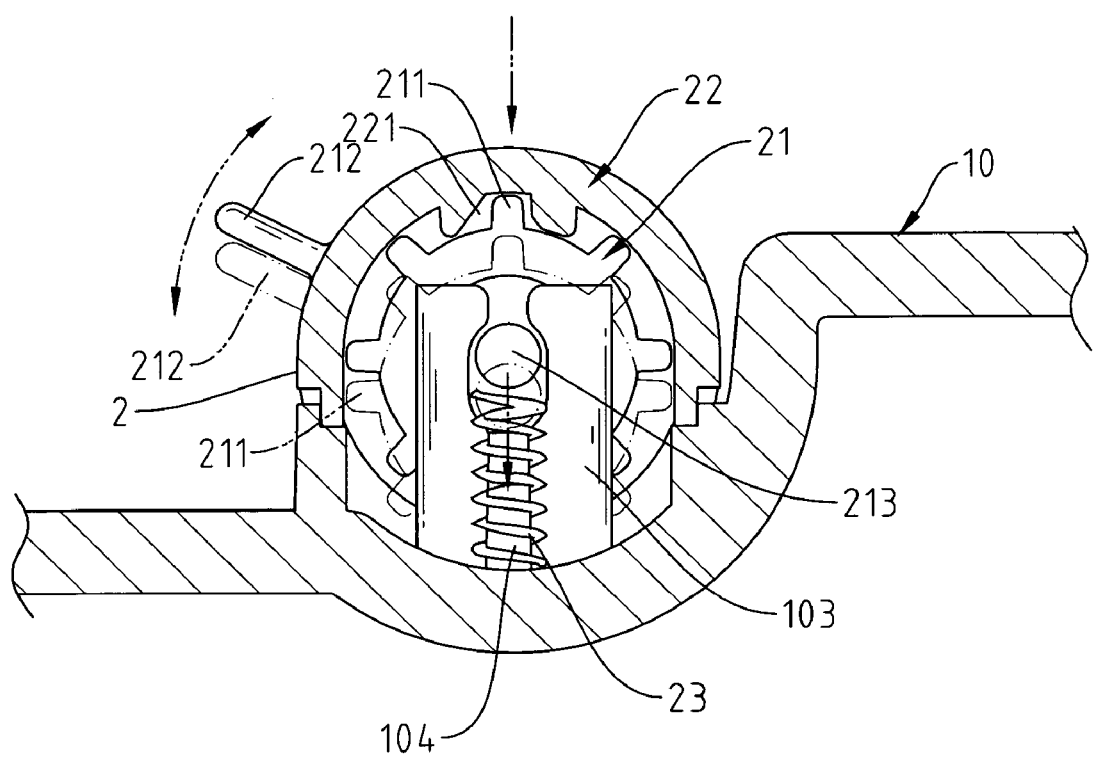
FIG. 11 is a schematic view showing the application of the positioning device of the present invention.
Figure 12:
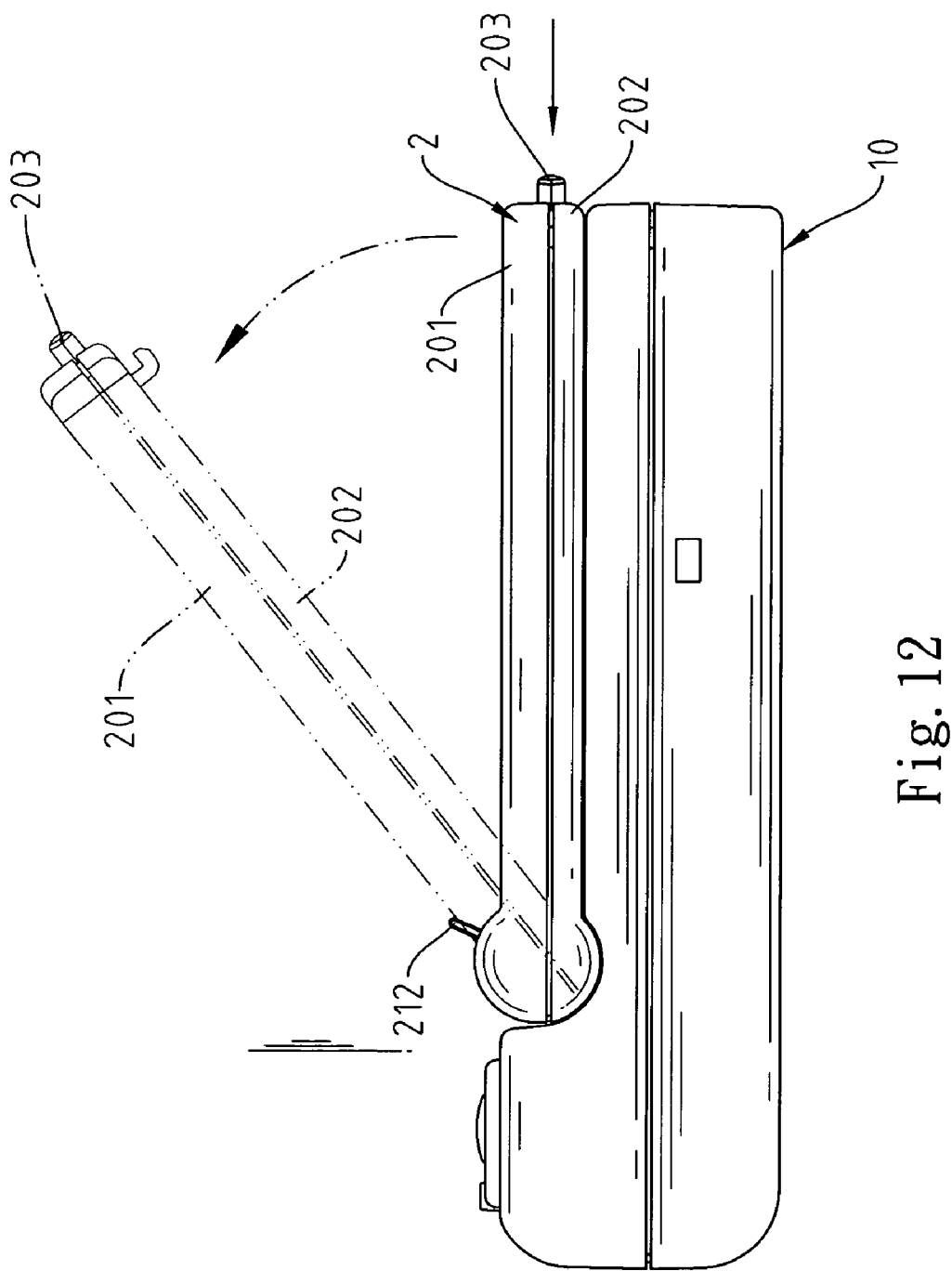
FIG. 12 is a diagram showing that the lid is lifted up by the positioning structure for the pivotal shaft in accordance with the preferred embodiment of the present invention.

Referring further to FIG. 11 and FIG. 12, the positioning structure for the pivotal shaft in accordance with the present invention is suitable for a product having a lid, wherein the inner sleeve 12 is pivotally connected to the outer sleeve 11 through the elastic device 13. The opposite ends of the inner sleeve 12 and the outer sleeve 11 are hooked by both ends of the elastic device 13, respectively. By pre-rotation of the inner sleeve 12, the anti-twist force is accumulated between the inner sleeve 12 and the outer sleeve 11. When the push-button switch 203 is separated from the buttonhole 101, the lid 20 is lifted up by the anti-twist force, which is provided by the released elastic device 13, since the lid 20 is locked to the buttonhole 101 through the push-button switch 203. As a result, as shown in FIG. 12, the function of automatic, pivotal rotation is generated.

Furthermore, as shown in FIG. 11, if the rotation ring 21 is separated from the locking trench 221 of the ring cover 22 by pressing, the rotation ring 21 is rotatable and adjustable. After being released, the rotation ring 21 is pushed upward by the compression springs 23 so as to lock the toothed rings 211 in the locking trench 221 again. If the lid 20 is lifted up by rotation, the lower edge of the lid 20 is exactly stopped by the limit block 212 protrudent from the rotation ring 21 for positioning the lid 20 to a predetermined angle automatically. Besides, the rotation ring 21 can be adjusted in accordance with the description mentioned above to facilitate user watching from different elevation angles.

What the invention claimed is:

1. A positioning structure for a pivotal shaft comprising: a positioning device for use in the pivotal shaft, the positioning structure for the pivotal shaft being located between a base and a lid of an electronic product, the lid comprising: an upper cover; a lower cover; a push-button switch mounted on the top edge of the lid; a shaft hole on each of two opposite ends, a gap on a bottom center of the lower cover; and two positioning pillars respectively on one side of the lower cover and the base in a proper spacing; the base comprising: a buttonhole corresponding to the push-button switch; a pair of reception trenches in positions corresponding to the center of the lid; a vertical rod on each side of the reception trench; a compression spring inserted by each vertical rod; and a locking hole located above the vertical rod; the pivotal shaft comprising: an outer sleeve; an inner sleeve; a fixing rod on a respective end of the outer sleeve and the inner sleeve; a through hole and a notch on each fixing rod; an elastic device locked to the notches on the fixing rods in opposite ends; and an axial rod on an axial of the outer sleeve for being inserted into the elastic device, the inner sleeve being pivotally connected to the inside of the outer sleeve, the inner sleeve and the outer sleeve being pre-rotated corresponding to one another, the inner sleeve and the outer sleeve being fixed on the positioning pillars through the through holes; and the positioning device comprising: a rotation ring and a ring cover, the rotation ring comprising: a limit block on an edge of the rotation ring; a toothed ring on each side; an axial shaft extended out of both ends of the rotation ring; an arc-shaped flange on each side of the ring cover for being coupled to an arc-shaped flange of the base to form a protrudent rod; a locking trench defined by two protrudent parts on the inside of the ring cover; and a protrudent pillar on the inside of the ring cover corresponding to the locking hole of the base, the axial shaft being pivotally mounted in the reception trenches of the base to lean on the compression springs, the ring cover being locked on the toothed rings, and the toothed rings being inserted into the locking trench, wherein an anti-twist force is accumulated between the inner sleeve and the outer sleeve by pre-rotation of the inner sleeve and the outer sleeve, the lid is lifted up by the anti-twist force to generate an automatic, pivotal rotation when the push-button switch is separated from the buttonhole, the rotation ring is rotatable and adjustable when the rotation ring is separated from the locking trench of the ring cover by pressing, the rotation ring is pushed upward by the compression springs to lock the toothed rings in the locking trench again after the rotation ring is released, and the lower edge of the lid is exactly stopped by the limit block protrudent from the rotation ring for positioning the lid to a predetermined angle automatically when the lid is lifted up by rotation.

* * * * *